Figure 1:
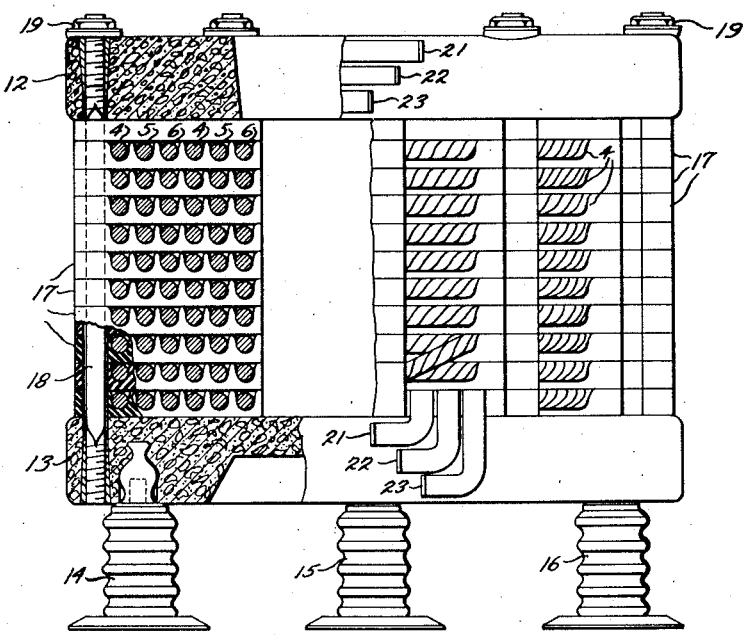

Jan. 7, 1941.                L. E. SAUER                2,228,093
POLYPHASE CURRENT LIMITING REACTOR
Filed Jan. 13, 1938

WITNESSES:
C. F. Olerheim
F. E. Hardy

INVENTOR
Louis E. Sauer.
BY
Ezra D. Savage
ATTORNEY

Patented Jan. 7, 1941

2,228,093

UNITED STATES PATENT OFFICE 2,228,093

POLYPHASE CURRENT LIMITING REACTOR

Louis E. Sauer, Sharon, Pa., assignor to Westinghouse Electric & Manufacturing Company, East Pittsburgh, Pa., a corporation of Pennsylvania Application January 13, 1938, Serial No. 184,827

5 Claims. (Cl. 171—242)

My invention relates to polyphase current limiting reactors, and has particular reference to current limiting reactors that are connected in power circuits as protective means for the generating equipment of the power station.

In power generating systems, it is of utmost importance that the service rendered be uninterrupted and that the power generating apparatus be protected against short circuits in order to ensure reliability of operation. With the development of power stations having large capacity units embodied therein, it is particularly desirable to protect each of the generators from service strains occasioned by short circuits, and to limit the possible local concentration of power at such occurrence.

When a short circuit occurs upon one of the feeders or distributing lines of the power system, each of the generators supplying power to the main feeder buses is required to furnish momentarily an abnormal load current until the circuit breakers associated with the affected feeder have had time to open and disconnect the feeder from the station buses, or until the speed of the generators has sufficiently decreased to prevent further current flow of an abnormal value.

Inasmuch as large-capacity high-speed turbo-alternators are frequently used as electrical power generators in modern stations, severe damage may result to these generators on the occurrence of a short circuit because of their ability to maintain a high speed for an appreciable time under severe loads, and because of their low internal reactance. A momentary short circuit current of 30 to 40 times full load current is not impossible and such quantities of current flowing in the generator windings may cause serious distortion and displacement of the conductors.

In order to limit the value of the momentary short circuit current to an amount that will not damage the generator or seriously affect the continuity of service a reactance is generally inserted in the circuit. This reactance may be inserted by adding an external current limiting reactor or by so designing the generator as to increase its self-inductive reactance. This invention is directed to a current limiting reactor external to the generator to which it affords protection.

It is usual when employing an external reactance to insert an air core current limiting reactor in each of the several phase conductors of the polyphase generator or feeder. The result of this arrangement is the permanent installation in the circuit of a fixed reactance, the reactive voltage being proportional to the load current. This is objectionable in that it introduces an element which in the case of the generators, causes a lowering of the power factor by causing a lagging current and, in turn, requires greater generator excitation to overcome it. In the case of feeders, it introduces a reactance that affects the regulation of the feeder adversely and causes an artificial voltage drop between terminals.

It has been proposed to employ polyphase reactors in which the several phase conductors are so wound as to be mutually inductively related to thus decrease the effective reactance in the circuit when the currents in the several phase conductors are balanced. Such polyphase reactors, however, are generally so constructed that the average diameters of the separate phase conductors vary from one another, so that the separate phase conductor turns are not simultaneously cut by equal quantities of magnetic flux, thereby producing a considerable unbalance in the reactance of the separate phases under balanced current conditions.

It is an object of my invention to provide a mutually coupled single or multi-circuit polyphase current limiting reactor which will have essentially zero reactance when the current in its several phase circuits is balanced and a substantial reactance when the current in the individual phase circuits is unbalanced.

Figure 2:
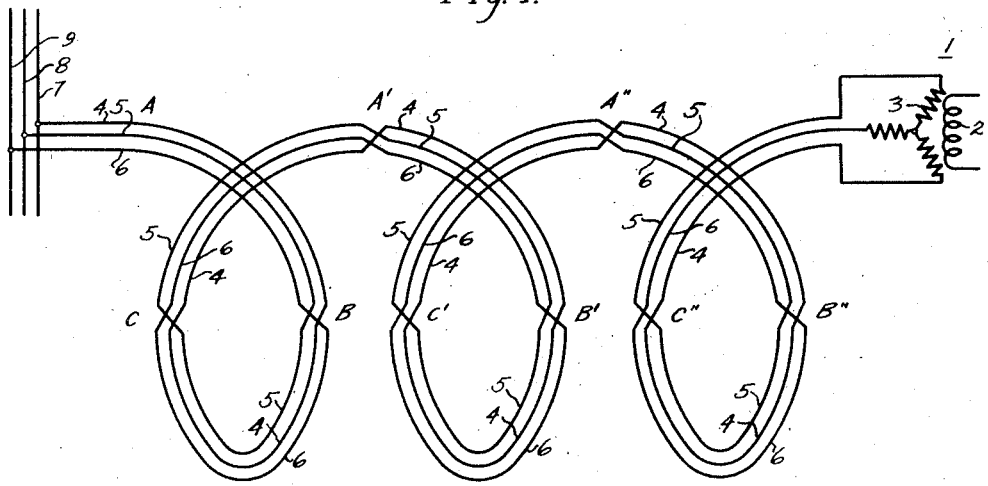

Other objects and advantages of my invention will be apparent from the following description of one preferred embodiment thereof, reference being had to the accompanying drawing, in which:

Figure 1 is a view partly in side elevation and partly in vertical section of a reactor constructed in accordance with the invention; and Fig. 2 is a diagrammatic illustration of the arrangement of the circuit conductors in the reactor.

Referring to Fig. 2, a generator 1 is illustrated having a field winding 2 and a three-phase armature winding 3 to which three phase terminal conductors 4, 5 and 6 are connected through a reactor, illustrated in Fig. 2 as having three turns, to supply a circuit represented by conductors 7, 8 and 9. As illustrated in Fig. 2, the three circuit conductors 4, 5 and 6 may be positioned in the reactor structure in the same horizontal plane at varying radii from the center of the coil that is made up of a plurality of layers of spirals one above the other, the average radius of the conductors in one layer corresponding to the radius of the conductors of the other layers, as clearly illustrated in Fig. 1.

In considering Fig. 2, it will be assumed that each individual spiral constituting one turn of the cable conductors about the axis of the coil constitutes one layer of the reactor, the three illustrated turns comprising three layers positioned one above the other. In the first turn starting at the left of the figure, the three phase conductors 4, 5 and 6 are positioned progressing inwardly toward the center of the coil and remain in this relative position through one third of the first turn represented by that portion of the turn between points A and B. At point B a transposition of the three conductors is made, the outer conductor 4 being carried inwardly to the central position, the central conductor 5 being carried inwardly to the inner position, and the inner conductor 6 being carried to the outer position. The length of turn from point B to point C constitutes another third of the winding turn and at point C a corresponding transposition of the conductors is made, conductor 6 being transposed from the inner to the central position, conductor 4 from the central to the inner position and conductor 5 from the inner to the outer position. The conductors remain in this relative position throughout the next third of a winding turn to the position A' at which point a similar transposition is made bringing the three phase conductors 4, 5 and 6 to the same relative positions at the beginning of the second turn, as existed at the beginning of the first turn. Throughout the second winding turn from the position A' to the position A'', transpositions are made at points B' and C' corresponding to those described at points B and C at equally spaced intervals about the winding turn. Similar transpositions are made in each successive turn, such as at points B'' and C''.

It will be appreciated that the diagram of a three-turn reactor shown in Fig. 2 is illustrative only and that the usual reactor would have many more turns and might be constructed so that each layer consists of the three conductors per layer only as shown in Fig. 2, or a multiple of this number such as the six conductors per layer shown in the construction in Fig. 1, in which two complete winding turns are made in each successive layer of conductors throughout the reactor structure.

In the transpositions of the conductors illustrated in Fig. 2, it will be noted that the peripheral spaces occupied by each conductor are equal for each winding turn, that is, the conductors are so arranged that each may, during each turn, individually occupy peripheral spaces of equal magnitude at equal radial distances from the center of the coil. In this manner, equal quantities of the centrally distributed magnetic flux generated by the coil may simultaneously cut the several conductors of each layer or section of the coil. Also, the length of each of the several conductors will be equal.

In the construction illustrated in Fig. 1, wherein six conductor spaces are provided in each layer, the symmetry will not be repeated for each winding turn of three conductors, but for each two turns completing one layer of the conductors in the structure, since the average radius of the three inner conductors will be less than the average radius of the three outer conductors in a given layer. Since, however, the three inner conductors are in series, respectively, with the three outer conductors, the average radius for the two complete turns representing one layer of the construction will be the same for each layer of turns.

The number of transpositions of the conductor throughout the reactor must be a multiple of the number of phase circuit conductors employed. For example, in the illustrated reactor a three-phase system is employed thus requiring three transpositions per turn or per even number of turns, in order that the several phase conductors each occupy peripheral spaces of equal magnitude at equal radial distances from the center of the coil throughout the winding.

The physical construction of the reactor may be of any suitable form such as that shown in Fig. 1, in which reenforced concrete discs 12 and 13 are employed at the top and bottom thereof, the lower disc being supported on three insulating footings 14, 15 and 16, the remaining construction consisting essentially of a plurality of fire-proof cleats 17 positioned one above the other and provided with openings in the upper portions thereof for accommodating the cable covered conductors 4, 5 and 6 in spaced relation in a well known manner. The entire structure including the fire-proof cleats and the reenforced discs is held together by enclosed tie rods 18 provided with nuts 19 for holding the structure in assembled position. Suitable terminals 21, 22 and 23 are provided at each end of the reactor to which circuit connections may be made. The two end layers of the reactor may each contain partial turns of the several conductors, such as one-third, two-thirds and a full turn for the three conductors, if desired, so long as the total number of turns and number of transpositions correspond for the several conductors.

A polyphase reactor constructed in accordance with the above disclosure may be radially made to provide a reactance, resistance and mutual inductance between phases within 2% of balance. The reactance of the coil will be substantially zero when the phase circuit currents are alike, the only voltage drop being that due to the resistance of the conductors. Such a reactor construction also provides a high reactance to limit the current flow in any of the three phase circuits.

Many modifications in the detailed arrangement of parts will appear to those skilled in the art within the spirit of my invention, and I do not wish to be limited otherwise than by the scope of the appended claims.

I claim as my invention:

1. In a polyphase alternating current power circuit having a plurality of phase conductors, means for introducing a current limiting reactance into said circuit comprising a coil consisting of the several phase conductors wound in the form of spirals, the several conductors occupying separate peripheral spaces of substantially equal magnitude at equal distance from the center of the spirals.

2. In a polyphase alternating current power circuit having a plurality of phase conductors, means for introducing a current limiting reactance into said circuit comprising a coil consisting of the several phase conductors wound in the form of spirals, said several conductors separately occupying substantially equal peripheral spaces at equal distances from the center of the coil, a plurality of such spirals comprising each of the superposed layers forming the coil.

3. In a polyphase alternating current power circuit having a plurality of phase conductors, means for introducing a current limiting reactance into said circuit comprising a coil consisting of the several phase conductors wound in the form of side-by-side spirals occupying separate peripheral spaces of substantially equal magnitude at equal distance from the center of the coil so formed.

4. In a polyphase alternating current power circuit having three phase conductors, means for introducing a current limiting reactance into said circuit comprising a coil consisting of the several phase conductors wound in the form of side-by-side spirals, the positions of the several phase conductors being transposed radially with respect to one another a number of times throughout the coil that is a multiple of the number of phase conductors whereby the lengths of all of the conductors are equal to one another.

5. In a polyphase alternating current power circuit having three phase conductors, means for introducing a current limiting reactance into said circuit comprising a coil consisting of the several phase conductors wound in the form of independent spirals that are superposed upon one another, said several conductors being so disposed relative to one another as to be simultaneously cut by equal quantities of magnetic flux.

LOUIS E. SAUER.